US010664255B2

(12) United States Patent
Simharajan et al.

(10) Patent No.: US 10,664,255 B2
(45) Date of Patent: May 26, 2020

(54) APPLICATION AWARE MANAGEMENT IN A NETWORK STORAGE SYSTEM

(71) Applicant: NetApp, Inc., Sunnyvale, CA (US)

(72) Inventors: Srishylam Simharajan, Cranberry Township, PA (US); Anureita Rao, San Jose, CA (US); Raj Lalsangi, Cary, NC (US); Srikumar Natarajan, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 129 days.

(21) Appl. No.: 15/607,340

(22) Filed: May 26, 2017

(65) Prior Publication Data

US 2018/0341472 A1 Nov. 29, 2018

(51) Int. Cl.
G06F 8/60 (2018.01)
G06F 9/50 (2006.01)
G06F 3/06 (2006.01)
H04L 29/08 (2006.01)

(52) U.S. Cl.
CPC .............. *G06F 8/60* (2013.01); *G06F 3/0605* (2013.01); *G06F 3/067* (2013.01); *G06F 3/0631* (2013.01); *G06F 9/5061* (2013.01); *H04L 67/1097* (2013.01)

(58) Field of Classification Search
CPC ........ G06F 8/60; G06F 3/0605; G06F 3/0631; G06F 3/067; G06F 9/5061; H04L 67/1097
See application file for complete search history.

(56) References Cited

U.S. PATENT DOCUMENTS

| 7,930,476 | B1 | 4/2011 | Castelli et al. |
| 8,082,330 | B1 | 12/2011 | Castelli et al. |
| 9,817,807 | B1* | 11/2017 | Nagargadde .......... G06F 17/248 |
| 9,893,953 | B1* | 2/2018 | Castelli ................. H04L 41/145 |
| 2005/0246397 | A1 | 11/2005 | Edwards et al. |
| 2005/0246503 | A1 | 11/2005 | Fair |
| 2008/0022012 | A1 | 1/2008 | Wang |
| 2013/0111034 | A1* | 5/2013 | Upadhya ............... G06F 3/0605 709/226 |
| 2016/0012070 | A1 | 1/2016 | Aggarwal et al. |
| 2016/0042090 | A1 | 2/2016 | Mitkar et al. |

(Continued)

OTHER PUBLICATIONS

Non-Final Office Action on co-pending U.S. Appl. No. 15/786,682 dated Sep. 19, 2018.

(Continued)

*Primary Examiner* — Jason D Recek
*Assistant Examiner* — Lesa M Kennedy
(74) *Attorney, Agent, or Firm* — Klein, O'Neill & Singh, LLP

(57) ABSTRACT

Presented herein are methods, non-transitory computer readable media, and devices for provisioning an application within a network storage system, which include: providing an application template; requesting input into the application template to construct the application in the network storage system and receiving the requested input; validating the input using standard templates for known applications stored within the network storage system; determining storage specifications within the network storage system based on the validated input; and creating storage and protocol objects associated with the application that identifies the storage specifications.

20 Claims, 4 Drawing Sheets

(56) References Cited

U.S. PATENT DOCUMENTS

2016/0154592 A1    6/2016   Goodman et al.
2016/0246683 A1    8/2016   Vijayan et al.
2018/0129821 A1    5/2018   Havewala et al.

OTHER PUBLICATIONS

Final Office Action on co-pending U.S. Appl. No. 15/786,682 dated Apr. 19, 2019
Non-Final Office Action dated May 2, 2019 for U.S. Appl. No. 15/607,348.
Notice of Allowance dated Oct. 17, 2019 for U.S. Appl. No. 15/607,348.
Notice of Allowance dated Oct. 31, 2019 for U.S. Appl. No. 15/786,682.

\* cited by examiner

APPLICATION AWARE MANAGEMENT IN A NETWORK STORAGE SYSTEM

TECHNICAL FIELD

The present disclosure relates generally to mass data storage networks and data storage filing systems for simplifying application storage, access and data management in network storage system and management software built around the network storage system. More particularly, aspects of this disclosure relate to methods, non-transitory computer readable media, and devices by providing application templates for provisioning and remaining aware of the type of the application later when delivering data management functionality at the granularity of an application.

BACKGROUND

As data management applications become more advanced and complicated, the physical tracking and mapping of an application in a network storage system becomes increasingly difficult. Furthermore, the entire process of provisioning an application has become unduly burdensome on administrators. During conventional application provisioning, the application administrator is required to decide where on a cluster a new application instance should be provisioned. Further, the administrator has to determine and implement the performance, capacity and protection characteristics of all the components of the application being provisioned. In addition, the administrator must determine the available performance and capacity headroom on the network storage system cluster and the protection capabilities of the network storage system cluster. Based on the available performance and capacity headroom on the network storage system cluster and the protection capabilities of the network storage system cluster, the administrator must decide the aggregates on which the application will be provisioned. Furthermore, the administrator has to create the appropriate number of volumes and LUNs (logical unit numbers) to obtain the optimal experience from the application.

In order to effectively provision an application, the administrator needs to be familiar with the specific network storage system storage terminology and storage administration. The administrator also needs backend infrastructure expertise to know which commands are required to run, and what options need to be set. Typically, an application is made up of multiple components (e.g. database files and logs). Often provisioning of a single component can fail, thus requiring the administrator to manually clean up any other application components that were previously provisioned.

Once an application has been successfully provisioned by the administrator, there exists no convenient process to determine which storage components and protocol components are utilized by the application. For example, where a specified number of volumes and LUNs are designated to act as storage for an exemplary application, after provisioning the application, the network storage system does not provide which volumes, LUNs and igroups are in use by the application. An igroup is a logical named entity that is assigned to one or more addresses associated with one or more initiators.

Conventional network storage systems provide data management functionality at the granularity of the volume or the file system. However, the storage elements of an application may span across one or more such volumes or file systems and the network storage system does not provide data management functionality at the granularity of an application instance. Keeping track of the mapping between storage and application is the responsibility of the application administrator. Because the network storage system does not track the mapping between the application and the storage components in use by that application, the network storage system cannot provide any application level reporting. Thus, the network storage system is unable to report how much storage capacity is in use by the application, or how many IOPS ("I/O operations per second") are being consumed by the application.

Figure 1:
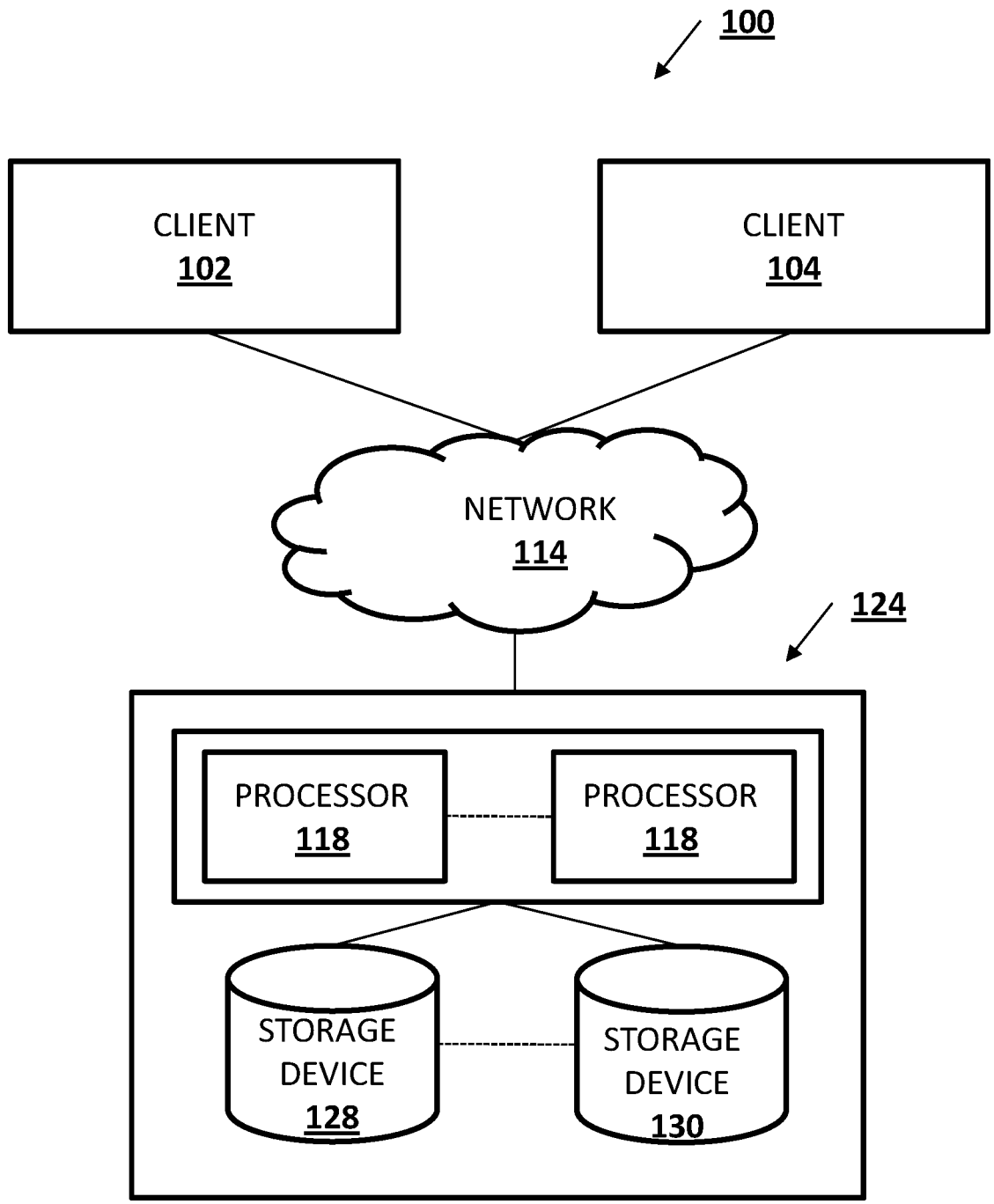
FIG. 1 exemplifies a schematic block diagram of a multiprocessor system in accordance with embodiments of the disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for creating an application aware management system in a network storage system. In exemplary embodiments, this is accomplished by creating a management object in the network storage system, known as an application instance. The application instance is configured to be provisioned and managed such that an administrator no longer needs to deal in volumes, aggregates, LUNs, etc. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage (NAS) environment, a storage area network (SAN), a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a Write Anywhere File Layout (WAFL®) file system.

Disclosed, for example, is a process for creating a first class management object in a network storage system, effectively titled application instance. The application instance is assigned a unique identifier by the network storage system. The network storage system also provides a set of interfaces that allow for an application instance to be provisioned and managed. In an exemplary embodiment of the disclosure, the set of interfaces includes a command line interpreter ("CLI") and Zephyr Application and Programming Interface (ZAPI) protocol. The application instance is made up of application components. The application components are discussed in more detail below.

Each application component is in turn associated with one or more LUNs and/or volumes. For example, in some embodiments each application component can consist of one or more volumes. These volumes can be on different aggregates, and on different nodes. In other words, an application instance can span an entire node cluster. In order to report capacity and performance utilization for an application the relevant statistics from all the underlying storage objects that belong to the application are collected. In some embodiments, the RAID (redundant array of independent disks) label of each volume that belongs to an application is tagged with an application identifier and an application component identifier. This information can be used to determine which volumes belong to the same application for the purposes of aggregation. In this way, the administrator no longer deals in volumes, aggregates, LUNs, etc., to track the application. Rather, the administrator is able to track the application objects directly.

In exemplary embodiments of the disclosure, application templates are provided to simplify application provisioning. Application templates are provided to application administrators. In exemplary embodiments, an application template is a list of parameter names, values, defaults and constraints describing storage objects, policies and access protocol configurations for a type of application. An application is created by choosing a particular application template type and then providing a network storage system with the template-type and the values for all the parameters required by the template. If a particular value is not provided, the network storage system will use the default specified in the template to provision the application. In exemplary embodiments, the template contains the business logic for a particular kind of application. This business logic indicates how to provision storage for the application and how to configure protocol access.

In exemplary embodiments of the disclosure, storage service classes (sSLCs) can be created for the application components to enable application management. In some embodiments, the service classes are used as an alternative to aggregates, performance polices, and the myriad of options/arguments/objects that are often found to be less user-friendly. In some embodiments of the disclosure, the new application object and information about the application components are stored in the network storage system. An object of the disclosure is to display the configuration of an application. This includes displaying the application components, the name of the template on which the application is based, the sizes and sSLCs of the components and protocol access information. This enables an administrator access to the storage objects that are being used by that application (i.e. the list of volumes/LUNs etc.).

Referring now to the drawings, wherein like reference numerals refer to like features throughout the several views, there is shown in FIG. 1 a block diagram of an example of a network storage system 100, in accordance with some embodiments of the present disclosure. The network storage system 100 includes clients 102 and 104 and a server 124, which is a storage server in this example. The clients 102 and 104 can be computers or other processing systems capable of accessing the storage server 124 either directly or indirectly over a network 114. The clients 102 and 104 can access the storage server 124 over the network 114 using wireless or wired connections supporting one or more point-to-point links, shared local area networks (LAN), wide area networks (WAN), or other access technologies. The clients 102 and 104 can be accessing data, applications, raw storage, or various combinations thereof stored on the storage server 124.

In this example, the network storage system 100 is a type of storage system that provides storage services to clients 102 and 104 using, for example, storage area network (SAN), network-attached storage (NAS), or other storage technologies processed on multiple processors 118. However, it should be appreciated that alternate embodiments of the network storage system 100 can deliver other types of computer services on a multiprocessor platform. For example, the storage server 124 can include web server technologies that deliver web pages and web services to the clients 102 and 104 over the Internet. In other embodiments, the storage server 124 can include other general purpose applications that can deliver various functionalities or data to the clients 102 and 104.

The storage server 124 is configured to operate according to a client/server model of information delivery thereby allowing multiple clients 102 and 104 to access files or other data simultaneously. In this model, the client 102 or 104 can be a computer running an application, such as a file-system protocol. Each client 102 or 104 can request the services of the storage server 124 by issuing storage-system protocol messages. For example, the clients 102 and 104 can request to either read data from or write data to the storage server 124.

In the example of FIG. 1, the storage server 124 is a file-level server, such as a server used in a NAS environment, a block-level storage server used in a SAN environment, or other storage systems capable of providing both file-level and block-level service. For example, the storage server 124 can use a combination of software and hardware to provide storage services including the organization of information on storage devices 128 and 130, such as disks. The storage server 124 includes a file system to organize logically the information as a hierarchical or other structure of directories and files on the disks 128 and 130.

Although the storage server 124 is illustrated as a single unit in FIG. 1, it can also be implemented in a distributed architecture. For example, the storage server 124 can be implemented with multiple distributed storage servers (not shown). Additionally, the storage server 124 can also include a physically separate network module and disk module (not shown), which communicate with other storage servers over an external interconnect. The network module functions as a front-end of the storage server 124, exporting services to the clients 102 and 104. The disk module functions as the back-end, managing and implementing a parity declustered distribution of a Redundant Array of Independent Disks (RAID) organization on the underlying storage of the storage server 124.

Figure 2:
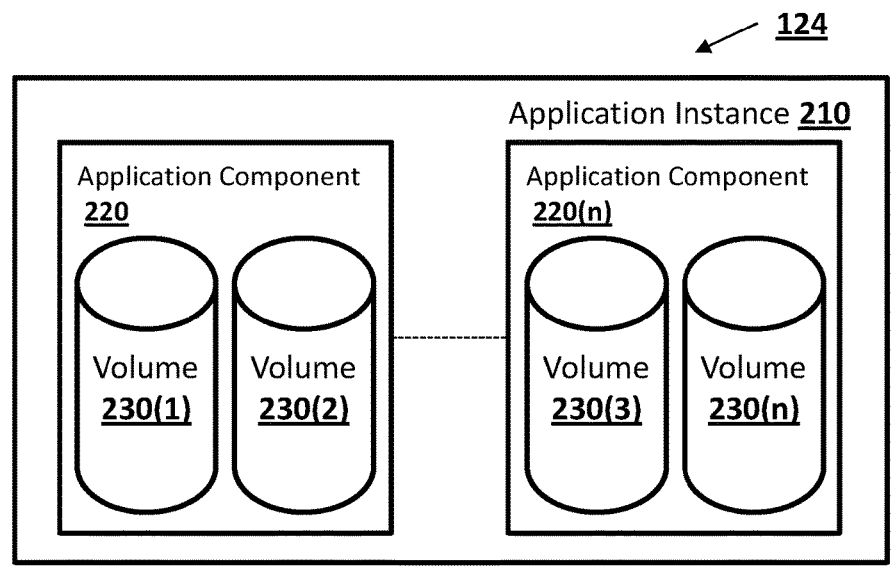
FIG. 2 is a schematic block diagram of the storage server in accordance with some embodiments of the disclosure

FIG. 2 is a schematic block diagram of the storage server in accordance with some embodiments of the disclosure. An application consists of a primary copy and its replicas. The relationship between the copies is called protection topology or just topology. Each copy is called an application instance and has its own performance and space requirements. The storage server 124 includes an application instance 210. Other components are of storage server 124 are omitted for clarity. The application instance 210 can be assigned a unique identifier within the storage server 124. The application instance 210 can include application components 220(1)-220(n). Each application component 220(n) can include one or more volumes 230(1)-230(n). These volumes can be on different storage aggregates, and on different nodes. In other words, an application instance can span part of or an entire network storage system cluster. In order to report capacity and performance utilization for an application, relevant statistics are collected from all the underlying storage objects that belong to the application (across different nodes in the cluster) and the data collated. In this way, the data is not merely aggregated, but intelligently sorted, grouped and put together. This is accomplished by creating varying service level classes associated with specific aggregates, volumes, and QoS policies on the various volumes. This is discussed in detail in connection with FIGS. 3 and 5.

Figure 3:
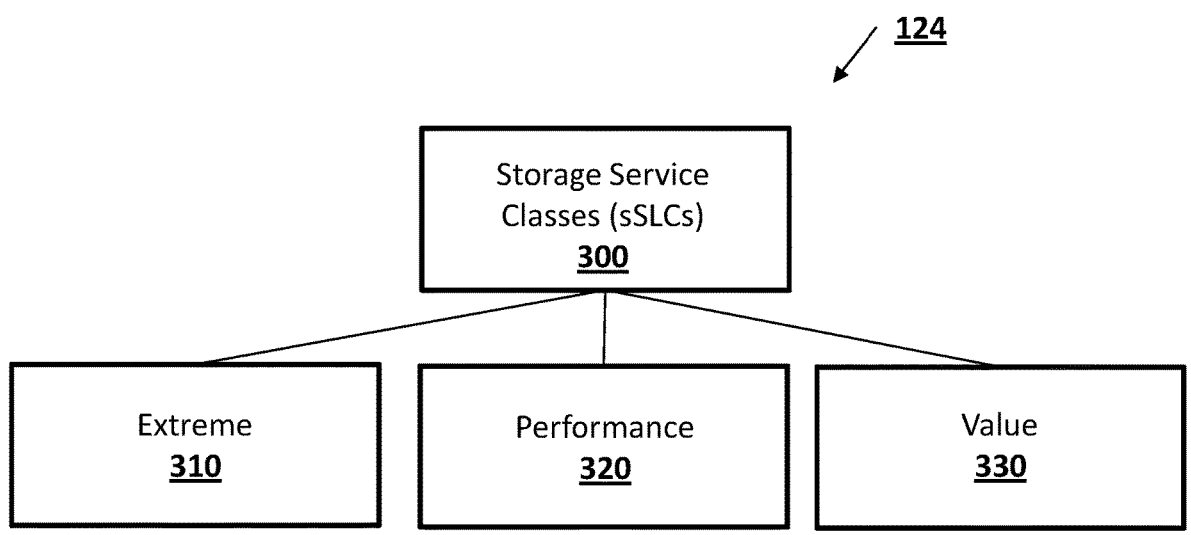
FIG. 3 is a schematic block diagram of service level class model stored within the storage server in accordance with embodiments of the disclosure.

FIG. 3 is a schematic block diagram of a service level class model 300 stored within the storage server 124 that can be advantageously used with the present disclosure. Storage service classes (sSLCs) 300 are provided to simplify the application management tools of an administrator. In exemplary embodiments of the disclosure, the sSLCs can include Extreme 310, Performance 320 and Value 330. It should be understood that more or less sSLCs can be implemented in the present disclosure than the three described herein. These are offered as alternatives to aggregates, performance polices, and the myriad of options/arguments/objects often found to be burdensome to manage. Each service class can be constructed such that the level of service is associated with pre-specified specifications of the storage server 124. For example, selecting storage service level "Extreme" can identify a specific aggregate, create a volume within the aggregate, and set a QoS policy on the volume configured under pre-designated parameters of the storage service level. This is the same for Performance 320 and Value 330. Each of the sSLCs 300 can include pre-designated parameters that are compatible with the intended application to be provisioned.

Figure 4:
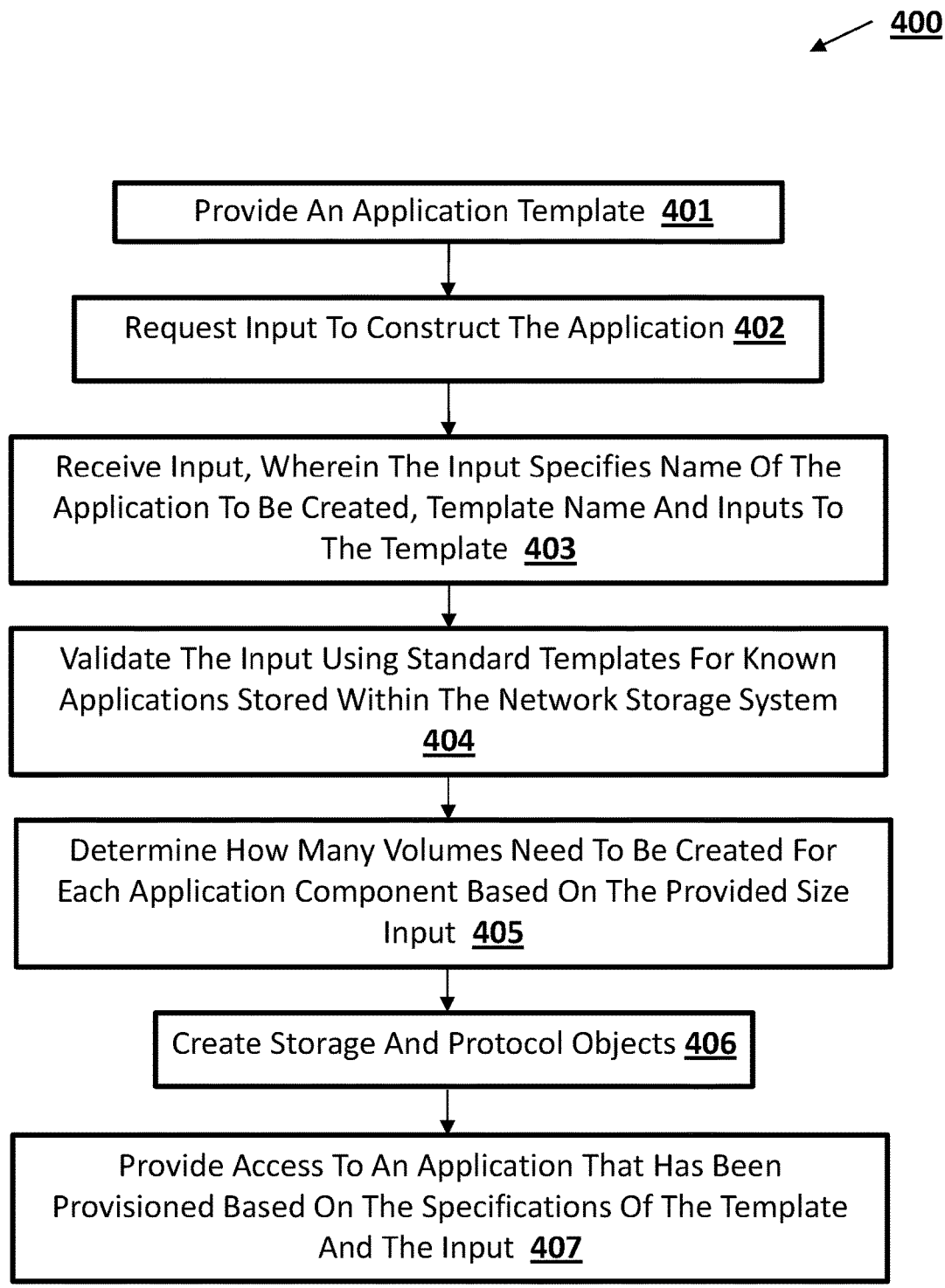
FIG. 4 illustrates a process flow diagram of a method for provisioning an application within a network storage system in accordance with an exemplary embodiment of the disclosure.

FIG. 4 illustrates a process flow diagram of a method for provisioning an application within a network storage system, indicated by general reference character 400. The process 400 commences at step 401 whereby an application template is provided. An application template is provided to application administrators to simplify the application provisioning. In exemplary embodiments, an application template is a list of parameter names, values, defaults and constraints describing storage objects, policies and access protocol configurations for a type of application. An application can be created by choosing a particular application template type and then providing the network storage system with the template-type and the values for all the parameters required by the template. In some exemplary embodiments, if a particular value is not provided, the network storage system will use the default specified in the template to provision the application. In exemplary embodiments, the template contains the business logic for a particular kind of application. This business logic indicates how to provision storage for the application and how to configure protocol access. For every application component the template encodes the desired sSLC for that component. This is discussed below in greater detail.

At step 402, inputs to construct the application in the network storage system are specified using the template. Examples of the inputs can include the database size, the sSLC for the database, the redolog-size and the sSLC for the redo log. At step 403, input is received that specifies the name of the application to be created, the template name and inputs to the template. For example, the inputs to the template can include the size of database, sSLC=Extreme, size of redo log and sSLC=Extreme. At step 404, the input is validated using standard templates for known applications stored within the network storage system. For example, the business logic in the network storage system can retrieve a well-known application type like OracleOnSAN© template, and validate the input at step 403 against the template. Furthermore, during validation, prerequisites can be validated as well. For example, the Network File System (NFS) can be checked to ensure it is licensed on the cluster.

At step 405, a determination is made as to how many volumes need to be created for each application component based on the provided size input and all the recommended best practices for this particular application in the network storage system]. Furthermore, a determination is made for what protocol objects (like export policies) need to be created based on the input received and where the desired volumes should be created in the cluster. This can be determined based on the number of volumes, the size of the volumes and the sSLC required. A review of the available headroom on the various nodes and aggregates in the cluster can be conducted before the best location for each volume is decided based on the input provided.

At step 406, the actual storage and protocol objects are created. The system deals with errors and requisite cleanup operations. The volumes created are associated with the protocol objects created. At this point, the application object is populated in the network storage system. Each of the application components associated with the application are tracked within the network storage system using the application object. In this way, for each application component tracked, the volumes and protocol objects created for that particular application component can also be tracked. The sSLC for the application component is also recorded.

At step 407, once creation is complete, the administrator has access to an application that has been provisioned based on the specifications of the template and the input. At this point the network storage system now has an application object on which various data management applications can be performed. For example, the configuration of the application can be displayed to the administrator. This includes displaying the application components, the name of the template on which the application is based, the sizes and sSLCs of the components and protocol access information. The administrator can also view which storage objects are being used for that application (i.e. the list of volumes/LUNs etc.).

Figure 5:
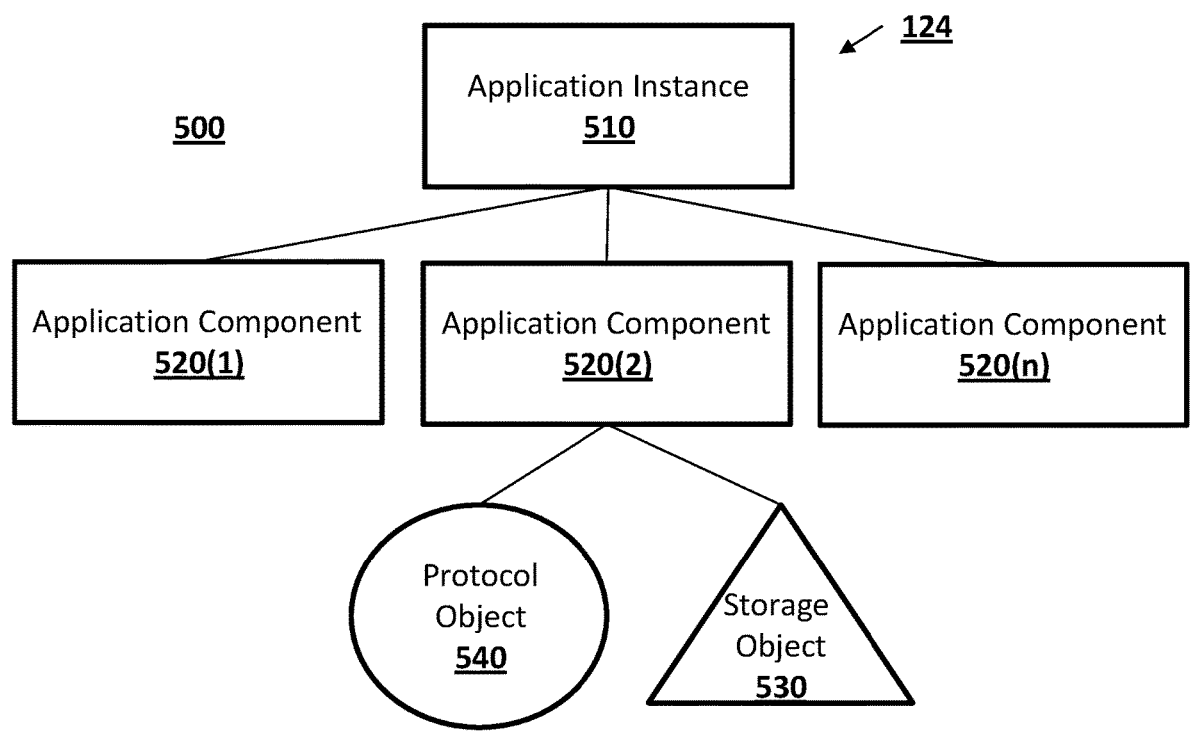
FIG. 5 is a schematic block diagram of an application model stored within the storage server in accordance with embodiments of the disclosure.

FIG. 5 is a schematic block diagram of an application model 500 stored within the storage server 124 that can be advantageously used with the present disclosure. As an initial matter, an application instance 510 is created. In some embodiments, an application instance is a copy of the application storage in a specified cluster. Furthermore, an application instance is a collection of items with different performance, space and local protection requirements, with all the items servicing the same application or virtual memory. In some embodiments, an application consists of one or more volumes depending on performance, space and local protection requirements. In some embodiments, storage items with different performance, space, local protection requirements go into different volumes.

First, a set of parameters that collectively describe the configuration of a potential or actual application are determined. The set of parameters represent the characteristics of the application. This can include database sizes, service levels, protocol access elements such as logical interfaces (LIFs) that an application administrator can specify in order to provision storage on a network storage system. The set of parameters also represent a fine granular representation of the network storage system entities. This can include LUNs and volumes with their respective sizes and service levels, and LIFs. The fine granular representation of the network storage system entities detail how the application administrator's high level specifications translate to the peculiarities of the storage system. The application has a unique application-name. Its configuration follows the model described in one of the application-templates, and includes at least one application-component 520.

An application-component 520 is a set of storage elements—volumes and/or LUNs—used to store the data associated with that application, and other characteristics. The application-component 520 can store characteristics such as the application capacity, storage-service levels, protection service levels and related properties. In addition, each application-component 520 can also have associated protocol access elements, such as initiator-groups, portsets or export-policies.

As shown in FIG. 5, an application instance 510 can include multiple application components 520. In some embodiments, an application can have anywhere between 1 and 10 application-components 520. For simplicity purposes, the application instance 510 in the illustrated embodiment includes 3 application-components 520. However, one of ordinary skill in the art would understand any number of application-components can be implemented herein. The application-component 520 can include a group of LUNs (for a SAN application) or volumes (for a NAS application). The application-components 520 can each point to a storage object 530 or protocol object 540. The storage objects 530 can include a LUN, volume or aggregate. In some embodiments, the constituents of an application-component 520 can differ based on the protocol—SAN, Network File System (NFS), Common Internet File System (CIFS)—used to access the application. For example, in some embodiments, an application-component 520 of a SAN application consists of 1 or more LUNs, spread across 1 or more volumes, whereas an application component of a NFS or CiFS application can consist of 1 or more volumes. In some embodiments, a single application-component is associated with a single storage-service level. In alternative embodiments, some applications with multiple application-components can simplify this further by exposing a single storage-service level for all the application-components of that application.

The protocol access elements of an application can be specified. An application-component 520 can also have one or more initiator groups if it is a SAN application-component, and associated list of initiators and portsets. Alternatively, in some embodiments, an application component 520 can have an export-policy and access-permissions if it is a NFS or CiFS application-component. The LUNs within the application-component 520 of a SAN application can be accessed by the set of initiators specified in the initiator-groups (igroups) associated with that application-component 520. Every igroup has a list of initiators associated with it, with 1 or more initiator WWPNs (World Wide Port Name) if accessed through Fibre-Channel protocol, or IP addresses if accessed using the iSCSI protocol. In addition, the user can also be required to specify the igroup-os-type.

The LUNs of an application-component 520 are mapped to the set of igroups associated with it by default. While an application-component 520 could have more than one such igroup associated with it, the typical application-component 520 is associated with a single igroup. Individual application templates can simplify that further by associating all the application-components of an application with a common set of or even a single igroup. The user can choose to use one or more existing igroups with an application-component or create one or more new igroups each with a set of initiators. Typically an application-component 520 is associated with a single igroup. However, in some embodiments of the disclosure, certain applications can support multiple igroups per application-component 520. Some applications with multiple application-components 520 can simplify this further by exposing a single igroup for all the application-components 520 of that application. Furthermore, parameters reflecting the current dynamic state of the application such as the input/output operations per second (IOPs) consumed and the capacity utilized of the application are collected. In some embodiments of the disclosure, the IOPS for each application component can be collected and displayed to the administrator. In alternative embodiments of the disclosure, the IOPS application wide can be collected and displayed to the administrator.

Metadata related to one or more RAID groups (i.e., RAID-related metadata) is stored as a RAID label on each storage device, e.g., hard disk drive (HDD) and/or solid state drive (SSD), of the storage server 124. The RAID label is typically organized as a topology tree structure that identifies, inter alia, a RAID group (i.e., a logical grouping within an aggregate operated cooperatively) to which the storage device belongs, as well as a generation count of the storage device. In some embodiments of the disclosure, the RAID label of each volume that belongs to an application is tagged with an application identifier and an application component identifier. This information is used to identify which volumes belong to the same application for the purposes of aggregation. In some embodiments, the capacity and performance counts across the application can be summed to create combination objects or 'combo objects'. Tagging the volume with the application id enables identification of the volumes that belong to the same application.

Thus, by utilizing the application-components 520 of the application instance 510, the administrator is able to track which volumes and LUNs belong to a particular application, which protocol endpoints are associated with the application and other relevant protocol configuration protocol configuration information (like igroups and export policies), and the expected service levels for each application component. In this way, the administrator is able to readily view the application configuration information.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, comprising:
   requesting input into an application template to construct an application in a network storage system and receiving the requested input;
   validating the input using a standard template for a known application stored within the network storage system;
   determining storage specification for the application within the network storage system based on the validated input; wherein the storage specification provides a number and location of logical objects for the application for storing data;
   creating a storage object and a protocol object associated with the application based on the determined storage specification, the application represented by an application instance; wherein the storage object is used by the networked storage system to store data for the application and the protocol object identifies a protocol specific parameter used to store and retrieve data from the networked storage system
   representing the application instance by a management object that includes an application-component that is based on configuration information of the application instance, the configuration information indicating a plurality of characteristics of the application;
   wherein the management object is associated with the storage object and the protocol object; and
   utilizing the management object for providing access to information regarding the storage object and the protocol object from the application instance.

2. The method of claim 1, wherein the application template comprises at least one of a list of parameter names, values, defaults and constraints describing storage objects, policies and access protocol configurations for a type of application.

3. The method of claim 1, wherein the input comprises at least one of at least one database size, a storage service class [sSLC] for a database, a redolog-size and a sSLC for the redo log.

4. The method of claim 1, further comprising: validating a prerequisite associated with provisioning the application.

5. The method of claim 1, wherein the storage specification comprises a number of volumes that need to be created for each application component within the application instance based on provided size input and where the volumes should be created in a cluster within the network storage system.

6. The method of claim 1, wherein the storage specification defines what protocol object needs to be created based on the received input.

7. The method of claim 1, further comprising: providing access to the application provisioned based on specifications of the application template and the input.

8. A non-transitory machine-readable medium having stored thereon instructions for performing a method comprising machine executable code which when executed by at least one machine, causes the machine to:
   request input into an application template to construct an application in a network storage system and receiving the requested input;
   validate the input using a standard template for a known application stored within the network storage system;
   determine storage specification for the application within the network storage system based on the validated input; wherein the storage specification provides a number and location of logical objects for the application for storing data;
   create a storage object and a protocol object associated with the application based on the determined storage specification, the application represented by an application instance; wherein the storage object is used by the networked storage system to store data for the application and the protocol object identifies a protocol specific parameter used to store and retrieve data from the networked storage system
   represent the application instance by a management object that includes an application-component that is based on configuration information of the application instance, the configuration information indicating a plurality of characteristics of the application;
   wherein the management object is associated with the storage object and the protocol object; and
   utilize the management object for providing access to information regarding the storage object and the protocol object from the application instance.

9. The non-transitory computer readable medium of claim 8, wherein the application template comprises at least one of a list of parameter names, values, defaults and constraints describing storage objects, policies and access protocol configurations for a type of application.

10. The non-transitory computer readable medium of claim 8, wherein the input comprises at least one of at least one database size, a storage service class [sSLC] for a database, a redolog-size and a sSLC for the redo log.

11. The non-transitory computer readable medium of claim 8, further causing the machine to: validate a prerequisite associated with provisioning the application.

12. The non-transitory computer readable medium of claim 8, wherein the storage specification comprises a number of volumes that need to be created for each application component within the application instance based on provided size input and where the volumes should be created in a cluster within the network storage system.

13. The non-transitory computer readable medium of claim 8, wherein the storage specification defines what protocol object needs to be created based on the received input.

14. The non-transitory computer readable medium of claim 8, further causing the machine to: provide access to the application provisioned based on specifications of the template and the input.

15. A computing device, comprising:
   a memory containing machine readable medium comprising machine executable code having stored thereon instructions;
   a processor coupled to the memory, the processor configured to execute the machine executable code to cause the processor to:
   request input into an application template to construct an application in a network storage system and receiving the requested input;
   validate the input using a standard template for a known application stored within the network storage system;
   determine storage specification for the application within the network storage system based on the validated input; wherein the storage specification provides a number and location of logical objects for the application for storing data;

create a storage object and a protocol object associated with the application based on the determined storage specification, the application represented by an application instance; wherein the storage object is used by the networked storage system to store data for the application and the protocol object identifies a protocol specific parameter used to store and retrieve data from the networked storage system represent the application instance by a management object that includes an application-component that is based on configuration information of the application instance, the configuration information indicating a plurality of characteristics of the application;

wherein the management object is associated with the storage object and the protocol object; and utilize the management object for providing access to information regarding the storage object and the protocol object from the application instance.

16. The computing device of claim 15, wherein the application template comprises at least one of a list of parameter names, values, defaults and constraints describing storage objects, policies and access protocol configurations for a type of application.

17. The computing device of claim 15, wherein the input comprises at least one of at least one database size, a storage service class [sSLC] for a database, a redolog-size and a sSLC for the redo log.

18. The computing device of claim 15, the machine executable code further causing the processor to: validate a prerequisite associated with provisioning the application.

19. The computing device of claim 15, wherein the storage specification comprises a number of volumes that need to be created for each application component within the application instance based on provided size input and where the volumes should be created in a cluster within the network storage system.

20. The computing device of claim 15, the machine executable code further causing the processor to: provide access to the application provisioned based on specifications of the template and the input.

* * * * *